Dec. 29, 1970  H. R. COOPER  3,551,897
METHOD OF CONTROLLING ORE FLOTATION
Original Filed Oct. 24, 1965
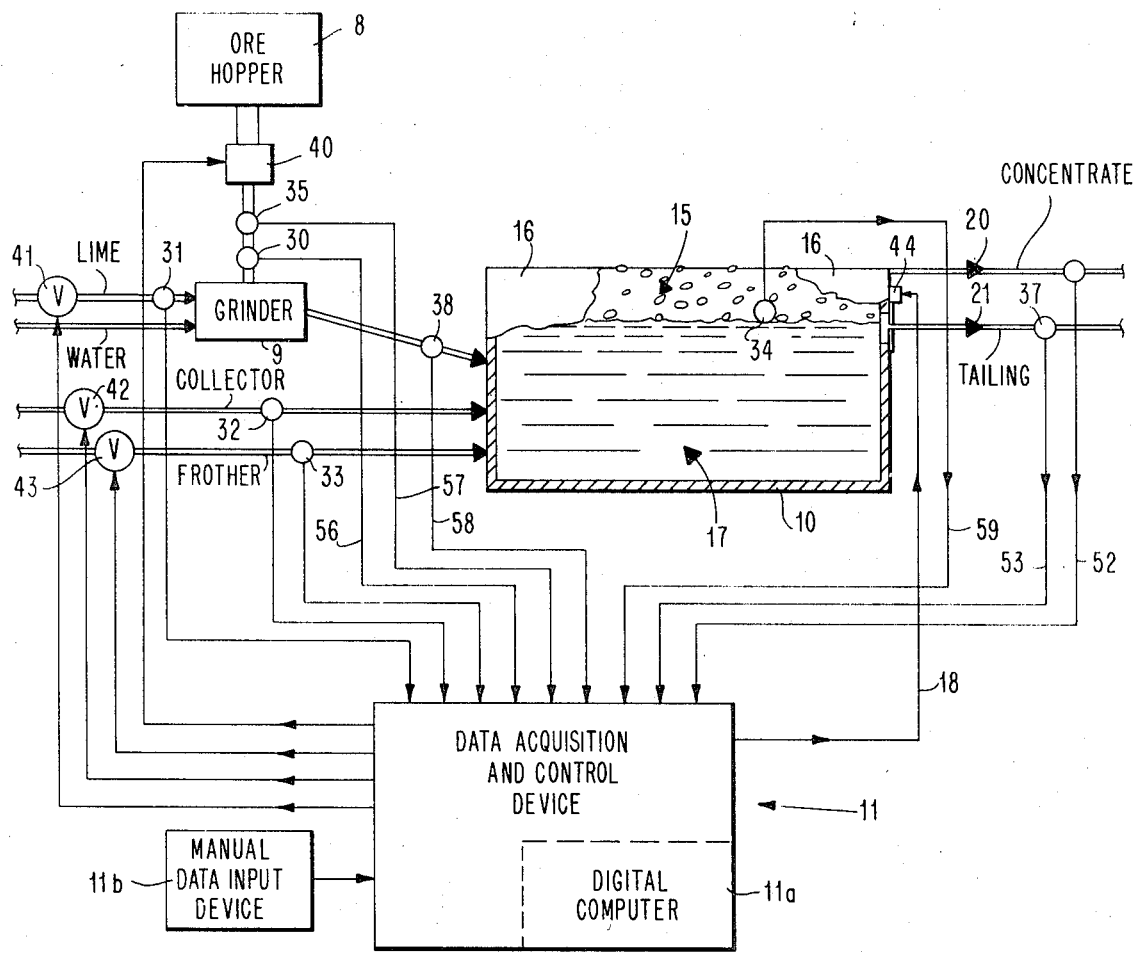
INVENTOR
HARRISON R. COOPER
By Elmer Galli
ATTORNEY United States Patent Office 3,551,897
Patented Dec. 29, 1970

3,551,897
METHOD OF CONTROLLING ORE FLOTATION
Harrison R. Cooper, San Jose, Calif., assignor to International Business Machines Corporation, New York, N.Y., a corporation of New York
Continuation of application Ser. No. 504,423, Oct. 24, 1965. This application Sept. 6, 1968, Ser. No. 791,198
Int. Cl. B03d 1/02; G06f 15/18, 15/46
U.S. Cl. 340—172.5                3 Claims

ABSTRACT OF THE DISCLOSURE

A method for combing economic optimization and operating optimization in an ore flotation plant. The method consists of measuring the operating conditions of the plant at a plurality of different closely related operating states; calculating a plurality of coefficients that, together with certain equations, describe the process at that particular time, utilizing the same equations and calculated coefficients to determine an operating state that results in greater profits, and changing the operating conditions of the plant so that increased profit is achieved.

---

This is a continuation of application Ser. No. 504,423, filed Oct. 24, 1965, now abandoned.

The present invention relates to mineral flotation and more particularly to feed back control of a continuous mineral flotation operation.

The prior art recognizes two distinct problems in the control of flotation plants. The first problem is an economic problem concerned with determining the optimum operating condition for a plant in order to maximize profits. The economic considerations relative to ore flotation are discussed in Chapter 22, "Flotation Economics" of a book entitled Froth Flotation, 50th Anniversary Volume edited by D. W. Fuerstenau, published by the American Institute of Mining, Metallurgical and Petroleum Engineering, Incorporated, 1962. The second problem recognized in the prior art is a problem of controlling the process in order to maintain the optimum operating conditions. This problem is discussed, among other places, in Chaper 21 entitled "Automatic Control for Flotation Plants" of the above referenced textbook.

In general, in the prior art, the two problems were considered separately. The optimum operating conditions for the plant were determined by a series of laboratory tests. Once the optimum operating conditions for the plant were determined, an attempt was made to maintain these optimum conditions in the plant either by manual control or by various automatic feed back control loops. Controlling a flotation plant in order to maintain certain presumed optimum conditions involves a large degree of personal judgment by the operator based on his experience. In general, the operator does not have a completely logical basis for controlling the plant. Furthermore, even if the operator alone or the operator in conjunction with various automatic feedback control apparatus can maintain the predetermined optimum conditions, the plant would not necessarily always be operating at its truly optimum condition since, as indicated on page 540 of the above referenced text, "in the actual plant environment the optimum conditions are often shifted considerably from those indicated by the laboratory experiments."

Various techniques have been suggested for overcoming the above explained problem of maintaining a truly optimum operating condition for a plant. One such technique is described in a paper entitled "EVOP" by George Box, published in Applied Statistics, Volume 6, No. 2, 1957. The technique described in this paper is statistical in nature in that it involves making many observations of the actual plant in operation after making small changes in the input variables. In this way, one can attempt to determine the optimum operating conditions for the plant. While this technique represents a significant advance over the prior art, it has certain disadvantages inherent in its statistical nature. For example, it involves making tests on the plant when it is operating. These tests require changes in the controllable variables and although the changes that are made may be small they may still upset or at least disturb the plant. Furthermore, when process parameters (such as the analysis of the ore) change frequently, the EVOP approach is unsatisfactory since often an appreciable time delay is required to reach a new equilibrium point and hence, it is not possible to try various control adjustments after reaching an equilibrium point and before the next change in process parameters occurs as required by the EVOP approach.

The present invention utilizes an entirely different technique from the above in order to achieve a maximum economic return from a particular plant. The present invention is applicable both to plants that are operating at nearly steady state conditions and to plants that are processing ores that change frequently.

The object of the present invention is to provide an improved technique for controlling an ore flotation plant.

A further object of the present invention is to provide a technique for controlling an ore flotation plant whereby the maximum economic operating conditions are determined and maintained.

Another object of the present invention is to provide a method for controlling an ore flotation plant that gives a logical basis for making adjustments that result in a maximum economic utilization of the plant.

A still further object of the present invention is to provide a technique that gives a logical basis for evaluating proposed changes in the plant's control settings.

Yet a further object of the present invention is to provide a technique of control which takes into account all of the significant parameters including the fact that the thruput of the plant changes depending upon the particular operating condition of the plant.

The above objects of the present invention are achieved by a method of controlling the flotation operation that that consists of measuring the operating conditions of the plant at a plurality of different closely related operating states: calculating a plurality of coefficients that, together with certain equations, describe the process at that particular time, utilizing the same equations and calculated coefficients to determine an operating state that results in greater profits, and changing the operating conditions of the plant so that said increased profit is achieved.

The foregoing and other objects, features and advantages of the invention will be apparent from the following more particular description of a preferred embodiment of the invention, as illustrated in the accompanying drawing.

FIG. 1 is a general schematic diagram of a system that utilizes the present invention.

An ore flotation plant generally includes a relatively complex flotation circuit having a large number of interconnected flotation cells. The present invention is applicable to either the control of a single flotation cell or to the overall control of a complex flotation circuit. It is equally applicable to batch operations and to continuous operations. For simplicity, the invention will first be described in detail relative to the control of a single continuous flotation cell and later, the manner of applying the same method to a complex flotation circuit will be explained.

As shown diagrammatically in FIG. 1, the simplified flotation circuit shown herein consists of an ore hopper 8, a grinder 9 and a tank 10. Ore, lime and water are supplied to grinder 9. The comminuted ore, water and lime (referred to as pulp) flows from the grinder to the flotation cell 10. Two other reagents are added in cell 10. These consist of a collector and a frother. As the ore is added into the cell 10, the mixture is agitated (by an agitator not shown herein) and air is passed through the resulting mixture (by means not shown herein). As a result, a layer of froth 15 is formed on the top of the flotation cell. Through a well known interaction of the reagents and the ore, a relatively high concentration of the desired element or mineral is suspended within the froth 15. The interaction of the reagents and the ore is described, among other places, in a textbook entitled Flotation by A. M. Gaudin, McGraw-Hill, 1957.

In the specific example shown herein, the invention is described as applied to flotation of copper bearing ore. Such ore may, for example, consist of a mixture of copper sulfides, complex copper iron sulfides and miscellaneous ore matrix materials referred to as "gangue." In this case, the collector could be a xanthate derivative such as sodium isopropyl xanthate and the frother could be pine oil. It should be appreciated that the present invention is generally applicable to all mineral flotation operations and it is not restricted to flotation of copper bearing ore.

In the flotation cell shown in FIG. 1, the copper is separated from the minerals in the ore by allowing the froth to pass out of the flotation cell by overflowing a weir 16 along the length of the cell. The froth is collected and the minerals suspended therein are screened out giving a concentrate herein indicated by line 20. The material that is not suspended in froth 15 forms tailings. This material is also withdrawn from the flotation cell as herein indicated by arrow 21. The details of flotation cell 10 are not described herein since construction details of flotation cells are described in the published literature and these details are not relevant to the present invention.

Flow meters 31, 32 and 33, respectively, measure the flow of lime, collector and frother into the flotation cell. A device 34 senses the thickness of the froth layer 15. Analyzing instruments 35, 36 and 37, respectively, determine the principal element (i.e. copper) content of the ore feed, the concentrate and the tailings. Measuring device 30 determines the rate of ore feed into the flotation cell and measuring device 38 determines the particle size distribution of the ore feed.

The amount of ore fed to flotation cell 10 is controlled by a feed control device 40. The amount of lime, collector and frother fed to the flotation cell 10 is controlled by valves 41, 42 and 43. The rate that tailings are withdrawn is controlled by gate mechanism 44. The thickness of the froth layer 15 is controlled by controlling the height of the interface between pulp 17 and froth 15. The position of the gate 44 fixes the level of the pulp in the cell and the distance between the top of the gate 44 and the weir is filled with froth.

The method of the present invention whereby control devices 40 to 44 are operated to achieve maximum efficiency from the plant will now be described. Herein, signals from sensing devices 30 to 38 are sent to a data acquisition and control system 11 that includes a digital computer 11a. The digital computer 11a generates appropriate control signals for devices 40 to 44. It should be appreciated, however, that if the process were operated slowly enough, theoretically, the same control operations could be performed by a human operator. In practice, this is not practical since the human operator could not respond quickly enough. However, other types of computing devices such as an analog computer or analog control circuitry could be designed to perform the operations herein described. It is, however, noted that such other implementations may not be economically practical due to the expense involved in designing and building special purpose circuitry.

In general, the method of the present invention is divided into two parts. During the first part of the operation the computer 11 accepts data from measuring devices 30 to 38. This data is then applied to a mathematical model of the process in order to determine a plurality of coefficients which, together with the mathematical model of the process represents the operation of the plant. During the second part of the operation, the calculated coefficients, together with the model of the process, are used to calculate new operating points for the plant. A large number of different operating points are chosen on a somewhat trial and error basis and each of the new operating conditions is compared against a profit equation for the plant in order to determine an operating condition which results in a greater profit. After the operating condition that results in maximum profit is determined the control variables 40 to 44 are adjusted accordingly and the procedure is repeated.

For convenience, all of the symbols used in the following discussion are tabulated and identified below. The signals generated by the sensing devices are:

| Signal reference number | Signal | Generated by— | Description |
|---|---|---|---|
| S1 | $x_I$ | Sensing Device 35 | The percent weight of desired element in flotation feed or input (lbs. of copper per one hundred lbs. of feed). |
| S2 | $x_C$ | Sensing Device 36 | The percent weight of the desired element in the concentrate (lbs. of copper per one hundred lbs. of concentrate). |
| S3 | $x_T$ | Sensing Device 37 | The percent weight of the desired element in the tails such as copper (lbs. of copper per one hundred lbs. of tails). |
| S4 | M | Sensing Device 38 | A description of particle size (e.g. the fractional number of lbs. left on a 100 mesh screen per lb. put on the screen). |
| S5 | n | Sensing Device 38 | Describes slope of size distribution of ore on a log log basis. |
| S6 | p | Sensing Device 31* | Measured lime addition ratio (lbs. of lime per ton of ore). |
| S7 | c | Sensing Device 32* | Measured collector addition ratio (lbs. of collector per ton of ore). |
| S8 | f | Sensing Device 33* | Measured froth addition ratio (lbs. of frother per ton of ore). |
| S9 | h | Sensing Device 34 | Measured froth height (inches). |
| S10 | i | Sensing Device 30 | Measured feed rate of ore (tons per hour). |
| S21 | P | Device 41** | Lime rate control ratio (lbs. of lime per ton of ore). |
| S22 | C | Device 42** | Collector rate control ratio (lbs. of collector per ton of ore). |
| S23 | F | Device 43** | Frother rate control ratio (lbs. of frother per ton of ore). |
| S24 | I | Device 40 | Ore input rate control setting (tons per hour). |
| S25 | H | Device 44 | Froth height control setting (inches). |

*Measuring devices 31, 32 and 33 give actual flow data and the symbols $p$, $c$ and $f$ indicate ratios of flow to ore feed. The quantities indicated by symbols $p$, $c$ and $f$ can be calculated by dividing the quantities indicated by devices 31, 32 and 33 by the quantity indicated by device 30.

**Control devices 41, 42 and 43 control actual flow; hence, the settings of these devices is obtained by dividing the control ratios P, C and F by the ore flow setting I.

Other quantities that enter into the following discussions:

Quantity:

- T — Rate tails are withdrawn from the cell (tons per hour).
- W — Rate that the concentrate is withdrawn from the cell (tons per hour).
- $v_r$ — Value of the recovered mineral or elements in the smelted state (e.g. dollars per ton of copper).
- $s_c$ — Cost of smelting the recovered mineral or element (e.g. dollars per ton of copper).
- $i_c$ — Cost of raw ore (e.g. dollars per ton of ore).
- $P_c$ — Cost of lime (e.g. dollars per lb.).
- $c_c$ — Cost of collector (e.g. dollars per lb.).
- $f_c$ — Cost of frother (e.g. dollars per lb.).
- $a_x$ — Coefficient that reflects mineralogical characteristics of copper in the ore.
- $a_g$ — Coefficient that reflects mineralogical characteristics of gangue in the ore.
- $b_x$ — Coefficient which reflects the retention of copper mineral in the froth.
- $b_g$ — Coefficient which reflects the retention of gangue material in the froth.
- $k_x$ — Coefficient that reflects kinetic flotation characteristics of the copper.
- $k_g$ — Coefficient that reflects kinetic flotation characteristics of the gangue.
- $R_x$ — Estimated ratio of weight copper minerals to weight of copper elements in the concentrate.
- $k_s$ — A constant that is related to the characteristics of the grinder 9 and which is determined at the same time that the number $n$ is determined.
- $g$ — Fraction of gangue material not removed from the flotation cell in the concentrate.

As previously indicated, the first step in the method of the present invention involves taking four measurements of each of the variables designated S1 to S10 above at four closely spaced time intervals. For example, the four sets of measurements could be taken at fifteen minute time intervals (a total elapsed time of one hour between Test I and Test IV). The time intervals should be chosen so that changes in ore characteristics are relatively small during the time interval. The four sets of data are then used to calculate values for the seven coefficients that are included in Equations 1 to 3 given below. In order to calculate value for coefficients $a_x$, $b_x$ and $k_x$, Equation 1 is written three times with three most recent sets of operating data. All of the quantities in Equation 1 are obtained from signals S1 to S10 except the coefficients $a_x$, $b_x$ and $k_x$. Therefore, by writing the Equation 1 three times utilizing three sets of measured data, one obtains three equations that have three unknowns. The three equations can be solved simultaneously by well known techniques to obtain values for $a_x$, $b_x$ and $k_x$.

In order to calculate values for coefficients $a_g$, $b_g$, $k_g$ and $R_x$, Equations 2 and 3 are written four times utilizing four different sets of operating data. In this manner, one obtains eight equations that have four unknowns; however, only four of the equations are independent. This set of eight equations can be solved simultaneously in order to find a value for $a_g$, $b_g$, $k_g$ and $R_x$.

The equations that represent a model of the process are:

(1)
$$\frac{x_T - \frac{a_x n}{(1-M)^{1/n}}}{x_I - \frac{a_x n}{(1-M)^{1/n}}} = e^{\left[-k_x \frac{c}{ip} e^{-\frac{(b_x h)}{p}}\right]}$$

(2)
$$\frac{g - \frac{a_g n}{(-M)^{1/n}}}{1.0 - \frac{a_g n}{(1-M)^{1/n}}} = e^{\left[\frac{-k_g}{ip} e^{-\frac{(b_g h)}{p}}\right]}$$

(3)
$$g = 1 + R_x(x_I - x_T) - \frac{x_I}{x_C} + \frac{x_T}{x_C}$$

As will be explained later, Equations 1 and 2 are essentially the same equations; that is applied once relative to copper and once relative to gangue.

An example of how the above equations are used to calculate values for the coefficients $a_x$, $b_x$, $k_x$, $a_g$, $b_g$, $k_g$ and $R_x$ will now be given assuming that the four measurements of the operation of cell 10 resulted in data given below and the value of $n$ at this time was 0.407.

| | $x_I$ | $x_C$ | $x_T$ | M | p | c | f | h | i |
|---|---|---|---|---|---|---|---|---|---|
| Test I | 0.97 | 8.80 | 0.10 | .100 | 2.7 | .100 | .30 | 12.5 | 107 |
| Test II | 0.93 | 10.00 | 0.11 | .042 | 3.0 | .094 | .30 | 12.0 | 113 |
| Test III | 1.02 | 9.40 | 0.15 | .140 | 2.9 | .094 | .30 | 12.0 | 110 |
| Test IV | 0.96 | 9.00 | 0.12 | .096 | 3.0 | .095 | .29 | 12.0 | 110 |

The Equations 1 and 3 can be written utilizing this data as explained below: Equation 1 is written three times utilizing three different sets of data. An example of how Equation 1 is written utilizing the data from Test I is given below:

(4)
$$\frac{.10 - \frac{a_x \cdot 407}{(1-.100)^{1/.407}}}{.97 - \frac{a_x \cdot 407}{(1-.100)^{1/.407}}} = e^{\left[-k_x \frac{.10}{(107)(2.7)} e^{-\frac{(b_x 12.5)}{2.7}}\right]}$$

Two other equations similar to the one given above can be written utilizing the data from Tests II and III. These three equations can be solved simultaneously for the three coefficients $a_x$, $b_x$ and $k_x$.

Next, Equations 2 and 3 are written four times using four different sets of data. An example of how Equations 2 and 3 can be written utilizing the test data from Test I is given below:

(5)
$$\frac{g - \frac{a_g(.407)}{(1-.100)^{1/.407}}}{1.0 - \frac{a_g(.407)}{(1-.10)^{1/.407}}} = e^{\left[\frac{-k_g}{(2.7)(107)} e^{-\frac{(b_g 12.5)}{2.7}}\right]}$$

(6)
$$g = 1 + \frac{R_x}{100}(.97 - .10) - \frac{.97}{8.80} + \frac{.10}{8.80}$$

By using all four sets of test data in Equations 2 and 3, one obtains eight equations that can be solved simultaneously for four coefficicents $k_g$, $a_g$, $b_g$ and $R_x$. It is noted that while eight equations result when Equations 2 and 3 are written as explained above, only four of the equations are independent.

The above calculations establish a value for $a_x$, $b_x$, $k_x$, $a_g$, $b_g$, $k_g$ and $R_x$. The values of these coefficients, together with Equations 1 to 3, define the operation state of the flotation cell 10 at the time the measurements are made.

The quantity M that appears in the above equation is a function of the rate of ore input $i$. For a particular grinder one can measure the quantity M for various values of ore input and thereby construct a table that gives a value of M for various values of ore input $i$. This table can be continuously updated during operation of the system.

Two other quantities must be calculated before going to the profit equation. These other quantities are the rate (T) that the tailings are withdrawn from the flotation cell and the rate (W) at which the concentrate or final product is withdrawn from the flotation cell during the test period. These two quantities can be calculated from the material balance Equations 7 and 8 given below. One can either use the data from one particular test to calculate values of W and T or preferably, one can use data that represents the average of the four tests.

(7) $$I = W + T$$

(8) $$Ix_I = Wx_C + Tx_T$$

Utilizing the above calculated values for the coefficients and other quantities calculated using Equations 7 and 8 above, one can experiment using Equations 1, 2, 3, 7 and 8 to determine the results of changes in control settings without disturbing the actual operation of flotation cell 10. One can choose or postulate a particular value for each of the five control signals. One can substitute these values into Equations 1, 2, 3, 7 and 8 together with the calculated coefficient and one can then determine the output of the flotation cell under the postulated condition. For example, after calculating the seven coefficients $a_x$, $b_x$, $k_x$, $a_g$, $b_g$, $k_g$ and $R_x$ at a particular operating point, one can postulate new values for lime rate $p$, collector rate $c$, frother rate $f$, froth height $h$, and feed rate $i$. Using the known relationship between M and $i$ one can determine a value for M at the new setting. One also would know $x_I$ since one would know the type of ore being processed. The quantity $n$ would be known from previous history. One can, therefore use Equation 1 to calculate the value of $x_T$ under the postulated conditions. Likewise, using Equations 2 and 3, one can calculate a value for $x_C$ at the postulated operating point. Using Equations 7 and 8 the values of W and T at the postulated operating point can be calculated. Thus, by postulating new values for the controllable values and using the previously calculated coefficients, one can determine what the flotation cell would produce if the controls were set to the postulated values.

The operation of the flotation cell at the postulated operating point can be economically evaluated by a profit equation hereinafter described to determine whether the flotation cell would operate more profitably at the new setting. If it is determined that it would operate more profitably at the new settings (and if an even more profitable setting cannot be determined by further experimentation) the actual setting of the controls is changed to the new and more profitable operating point.

The profit equation for the flotation cell takes into account the cost of the materials used and it evaluates the value of the output from the cells to determine the profitability of operating a particular point.

As given below, the profit equation only takes into account the variable cost. It should be appreciated that the cost of the operation also includes certain fixed costs. However, for simplicity, and since these costs do not change with changes in operating conditions, in the simplified example given herein they are not taken into account when economically evaluating different operating points.

The major variable costs for a flotation plant include: the cost of the ore, the cost of the lime, the cost of the collector, the cost of the frother and the cost of smelting the ore that is recovered.

The other portion of the profit equation relates to the economic return from operating the flotation cell. This is easily calculated by multiplying the rate of concentrate withdrawn (W) times the concentrate grade ($x_C$) times the value of the recovered mineral ($v_r$). The profit therefore, equals the value of the recoverable copper minus all of the following: (1) cost of ore, (2) cost of lime, (3) cost of collector, (4) cost of frother, (5) smelting cost, and (6) other costs as may be appropriate such as the assigned value of mineral lost in smelting. Using the previously defined symbols, one can write the profit equation as:

(9) $$\text{Profit} = Wx_Cv_r - I_cI - L_cL - C_cC - F_cF - s_cWx_C$$

New operating states for the flotation cell can be evaluated by using Equations 1, 2, 3, 7 and 8, the seven previously defined coefficients, a previously calculated value of $n$, the known relationship between M and $i$, and profit Equation 9. A new operating point can be postulated by defining values for the collector rate, the frother rate, the frother height, the lime rate and the ore input rate. As previously explained, in order to evaluate a postulated operating point the postulated values are substituted in Equation 1 in order to calculate the weight fraction of the desired element in the tail ($x_T$) that would result from such a setting. Substituting the same postulated values in Equations 2 and 3, one can calculate the weight fraction of the desired element in the concentrate ($x_C$) that would result from the postulated setting. Once the values of $x_T$ and $x_C$ that would result from the postulated setting has been calculated, one can utilize Equations 7 and 8 to calculate the rate that the concentrate (W) and tails (T) are withdrawn. Once this is calculated, Equation 9 can be utilized to calculate the resulting profit. If the calculations from the postulated values for the control settings indicate that the profit would be increased by going to the postulated state (or no other operating point that results in a still higher profit can be found) the controls should be activated to place the cell at the new operating point.

Naturally, a manual evaluation of alternate operating points would be very tedious and time consuming. There are, however, standard computer programs that can automatically and efficiently perform this operation. For example, the International Business Machines Corporation supplies a commercially available program known as the IBM PROBE program (explained and defined in IBM 1620 Program Information Department, Publication No. 1620 10.4006). In order to utilize the PROBE program, one must supply (a) a set of equations; (b) the variables in these equations for which one would like the program to postulate new values; (c) the criterion that is to be used in order to determine if new values which satisfy the equations are superior (herein, this criterion would merely be a maximum profit as defined by Equation 9). The PROBE program then automatically sequences the computer through the necessary operations that determines the values that both satisfy the specified equation (Equations 1, 2, 3, 7 and 8 herein) and which maximizes the stated criterion (profit Equation 9 herein).

Thus, given Equations 1, 2, 3, 7 and 8 and the five particular quantities in Equations 1, 2 and 3 which can be varied and the allowable limits for the variations in these quantities, the PROBE program will automatically determine the particular set of values for the controllable quantities than can maximize profit Equation 9. These newly calculated control signals can then be fed to the appropriate outputs by the Data Acquisition and Control System 11 in order to change the cell 10 to the new and more profitable operating point. It is noted that as previously indicated the signals sent to devices 41, 42 and 43 should have a magnitude equal to the quantities P, C and F times I because each of the quantities C, P and F is a ratio relative to ore feed rate.

The Data Acquisition and Control System 11 could comprise an IBM (trademark) 1710 System which includes as digital computer 11a) an IBM (trademark) 1620 computer. Alternately, the Data Acquisition and Control System 11 could comprise the commercially available IBM (trademark) 1800 Data Acquisition and Control System. Meters 30 to 33 are commercially available flow meters. Analyzing instruments 35 to 37 are X-ray fluorescence on-stream analyzers such as those commercially available from Norelco (trademark). Device 38 can either be an automatic shaker mechanism which deposits a fixed amount of pulp onto a particular mesh screen and vibrates the screen for a certain amount of time and thereafter automatically weighs the remaining material on the screen or, alternately, device 38 could include a manually operated device whereby an operator manually places a certain amount of materials on a vibrating screen and weighs the material after a certain amount of time. Control devices 40 to 43 can be commercially available material feed devices.

In one installation where the present invention is being applied, the computer 11 consisted of an IBM (trademark) 1620 Mod. II computer that includes a card reader and typewriter for entering process data manually. The programming needed in order to perform the previously described mathematical operation could be easily provided by a skilled programmer. Furthermore, as previously indicated, Data Acquisition and Control System 11 could be eliminated. If this was done, the method of the present invention could be carried out manually in the sense that the operator could observe meters or indicators that gave the required data, he could perform the necessary calculations and then he could set the control devices 40 to 44 in accordance with the present invention.

As shown herein, the invention is applied to an extremely simple flotation circuit. As is well known to those skilled in the art, many flotation plants comprise complex flotation circuits. The present invention can be either applied to each part of a complex flotation circuit or it can be applied to an entire plant by considering the entire complex flotation circuit as a single unit. Naturally, by breaking the complex flotation unit down into a plurality of parts and applying the method of the present invention to each of the parts, superior results are obtained.

As described herein, the only reagents added to the plant consist of lime, collector and a frother. As is known in the art, many other reagents may be added. Since the quantity of the other reagents added could be determined by standard techniques, they are not described or referred to herein. The amount of water added to grinder 9 can be in direct proportion to the amount of ore added to the grinder so as to keep the density of the pulp constant.

Herein, only one element (namely, copper) is considered. The same technique could be applied in a more complex manner by using equations similar to Equation 1 to calculate three coefficients for each of a plurality of elements. In this case, devices 35 to 37 would have to supply an indication of the quantity of the other elements under consideration.

As previously indicated, the quantity $n$ is the number that represents the characteristics of grinder 9. This number can be determined from the information supplied by sensing device 38. As previously indicated, sensing device 38 gives an indication of the percents of material in the ore feed which will not pass through various standard screens such as 48, 100, 150, 200 and 270 mesh screens. The quantity $n$ is calculated from the information supplied by measuring device 38 in accordance with formula (10) given below:

(10)
$$(1-M) = \left(\frac{j}{k_s}\right)^n$$

where:

M is a description of particle size (e.g. the fractional number of lbs. left on a 100 mesh screen per lb. put on the screen);
$j$ is the metric equivalent of the screen mesh size (i.e. the number of microns), and
$k_s$ is a constant calculated along with value of $n$.

The values for $n$ and $k_s$ can be calculated from two measurements of screen residue, M, say for 100 mesh and 200 mesh screens. Alternately, values for $n$ and $k_s$ can be calculated using well known regression analysis techniques when more than two screen residue measurements are taken. The number $n$ does not change appreciably as the thruput of the grinding mill is changed and it therefore only need be determined at infrequent intervals and during any calculation using Equations 1 and 2 previously determined values for $n$ can be utilized.

As previously indicated, Equations 1 and 2 are essentially the same equations that are applied once relative to copper and once relative to the gangue. The only significant difference between Equations 1 and 2 is the first term in the numerator and the first term in the denominator of the left hand side of the equations is different. The first term in the denominator of the left hand side of Equation 1 is the quantity $x_I$ which represents the percentage of copper in the input ore. Since a very high percentage of the input ore consists of gangue, Equation 2 has been normalized relative to this term and rather than placing a quantity as the first term in the denominator representing the percentage of gangue in the input ore, the numeral 1.0 is placed there. The second difference between Equations 1 and 2 is that the first term in the numerator of Equation 1 is the quantity $x_T$; whereas, the first term in the numerator of Equation 2 is the quantity $g$. The quantity $x_T$ represents the percentage of copper in the tailings. The quantity $g$ is equivalent to the quantity $x_T$; however, the quantity $x_T$ can be directly measured while the quantity $g$ cannot be easily measured directly. Hence, the quantity $g$ is calculated using Equation 3 which includes the coefficient $R_x$ that amounts to an estimate of the ratio of weight of copper minerals to the weight of copper elements in the concentrate. In light of the above, Equations 1 and 2 can be written in a general form as:

$$\frac{Y_T - \frac{a_y n}{(1-M)^{1/n}}}{Y_I - \frac{a_y n}{(1-M)^{1/n}}} = e^{\left[-k_y \frac{c'}{ip} 0^{-\frac{(b_y h)}{p}}\right]}$$

where:

$Y_T$ and $Y_I$ are the percentage of a particular substance in the tailing and input, respectively;
M is a description of particle size (e.g. the fractional number of lbs. left on a 100 mesh screen per lb. put on the screen);
$n$ describes slope of size distribution of ore on a log log basis (see Equation 10);
$c'$ is the measured collector addition ratio (lbs. of collector per ton of ore). The collector referred to by the letter $c'$ is the collector that reacts on the surface of the mineral containing the substance Y. (Note Equation 2 does not have a term $c$ because there is no collector for the gangue material.)
$p$ is the measured lime addition ratio (lbs. of lime per ton of ore);
$i$ is the measured feed rate of ore (tons per hour);
$h$ is the measured froth height (inches), and
$a_y$, $b_y$ and $k_y$ are coefficients.

Equation 3 would be written in the following form when such a plurality of elements were considered, with the understanding that some proportion of unrecognizable or matrix material (gangue) would always be present.

$$Y_C = \frac{Y_I - Y_T}{\left[1 - g\left(1 - \sum_i Y_{iI}\right)\right] + \sum_i (Y_{iI} - Y_{iT}) R_{ix}}$$

where:

the summation over $i$ terms represents the fact that all elements of the plurality of elements being considered are taken into account in determining the concentrate weight fraction of the particular element noted by nonsubscripted Y.

In the foregoing explanation, after the various coefficients are calculated from the measured data, a value for $x_C$ is calculated under postulated conditions by substituting the calculated coefficients and the postulated conditions in Equations 2 and 3. Alternately, one could rewrite Equation 3 in the following form so that the term $x_C$ appears explicitly and facilitates computation:

$$x_C = \frac{x_I - x_T}{[1 - g(1 - x_I) + (x_I - x_T)R_x]}$$

When new values for the controllable parameters are postulated, certain constraints must be taken into account. For example, the lime rate has a certain upper limit beyond which lime cannot be fed due to mechanical limitations. Furthermore, in order to achieve a proper balance between the lime ratio and the frother ratio, postulated values for lime ratio and frother ratio are coordinated to the extent that sets of postulated values of lime ratio and frother ratio satisfy the following relationship:

$$F = \frac{P}{p} f$$

where:

F and P are postulated ratios of lime and froth, and
p and f are the last measured values of the lime and frother ratios.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A process for the recovery of copper from ore which contains copper co-mingled with other material in a plant having means for controlling variables affecting plant operation, said means including
    (A) means for forming a pulp by grinding said ore into fine particles and adding water and lime;
    (B) means for depositing said pulp, a collector and a frother in a flotation cell;
    (C) means for agitating the mixture in said cell to form a froth;
    (D) means for measuring at a plurality of different operating states the particle size distribution of the ore, the lime addition ratio, the collector addition ratio, the frother addition ratio, the froth height, the percentage weight of the copper in the input, the percentage weight of the copper in the concentrate, and the percentage weight of copper in the tails to determine the operating conditions of the plant at a plurality of different operating states;
    (E) adjusting means for adjusting the lime addition ratio, the collector addition ratio, the frother addition ratio, the ore input and the froth height to values specified,
said process comprising
    (E1) using a computer to calculate a plurality of coefficients that define the operation of the plant as a function of the manner in which said means for controlling variables affecting plant operation are operated, said coefficients including:
        a coefficient that reflects mineralogical characteristics of copper in the ore;
        a coefficient that reflects mineralogical characteristics of gangue in the ore;
        a coefficient that reflects stability of froth with respect to mineralogical characteristics of the copper;
        a coefficient that reflects stability of the froth with respect to mineralogical characteristics of the gangue;
        a coefficient that reflects kinetic flotation characteristics of the copper;
        a coefficient that reflects kinetic flotation characteristics of the gangue; and
        a coefficient that reflects an estimated ratio of weight of copper minerals to weight of copper element in the concentrate;
    (E2) using a computer to postulate a plurality of new operation states for the said means for controlling variables;
    (E3) using a computer to theoretically set each of the means for controlling variables to the postulated operation states and to determine the discharge characteristics of the plant at each operating state by means of said coefficients;
    (E4) evaluating the profit produced by the plant at each theoretical setting of the means for controlling the variables by determining the difference between the value of the recovered copper and the cost of the ore, the cost of reagents, and the cost of reducing said copper at each operating state;
    (E5) using a computer to select a continuing conditions state for the said means for controlling variables that results in increased maximum profit; and
    (E6) setting the means for controlling variables in accordance with the setting of the continuing operating state.

2. The process of claim 1, wherein the coefficients are calculated, using the computer, in accordance with the following equations:

(1) 
$$\frac{x_T - \frac{a_x n}{(1-M)^{1/n}}}{x_I - \frac{a_x n}{(1-M)^{1/n}}} = e^{\left[-k_x \frac{c}{ip} e^{-\frac{(b_x h)}{p}}\right]}$$

(2)
$$\frac{g - \frac{a_g n}{(1-M)^{1/n}}}{1:0 - \frac{a_g n}{(1-M)^{1/n}}} = e^{\left[\frac{-k_g}{ip} e^{-\frac{(b_g h)}{p}}\right]}$$

(3) 
$$g = 1 + R_x(x_I - x_T) - \frac{x_I}{x_C} + \frac{x_T}{x_C}$$

where:

$a_x$, $b_x$, $k_x$, $a_g$, $b_g$, $k_g$, and $R_x$ are the coefficients enumerated in claim 2;

$x_I$ is the precent weight of desired element in flotation feed or input (lbs. of copper per one hundred lbs. of feed);

$x_C$ is the percent weight of the desired element in the concentrate (lbs. of copper per one hundred lbs. of concentrate);

$x_T$ the percent weight of the desired element in the tails such as copper (lbs. of copper per one hundred lbs. of tails);

M is a description of particle size (e.g. the fractional number of lbs. left on a 100 mesh screen per lbs. put on the screen);

n describes slope of size distribution of ore on a log log basis;

p is the measured lime addition ratio (lbs. of lime per ton or ore);

c is the measured collector addition ratio (lbs. of collector per ton or ore); and h is the measured froth height (inches).

3. The process of claim 1, where the coefficients are calculated, using the computer, in accordance with the following equations:

$$\frac{Y_T - \frac{a_y n}{(1-M)^{1/n}}}{Y_I - \frac{a_y n}{(1-M)^{1/n}}} = e^{\left[-k_y \frac{c'}{ip} e^{-\frac{b_y h}{p}}\right]}$$

where:

$Y_T$ and $Y_I$ are the percentage of a particular substance in the tailing and input, respectively:

M is a description of particle size (e.g. the fractional number of lbs. left on a 100 mesh screen per lb. put on the screen);

$n$ describes slope of size distribution of ore on a log log basis;

$c'$ measured collector addition ratio (lbs. of collector that reacts with mineral containing Y, per ton of ore);

$p$ measured lime addition ratio (lbs. of lime per ton of ore);

$i$ measured feed rate of ore (tons per hour);

$h$ measured froth height (inches); and $a_y$, $b_y$ and $k_y$ are coefficients.

References Cited

UNITED STATES PATENTS

| 3,094,484 | 6/1963 | Rizo-Patron | 209—166 |
| 3,175,968 | 3/1965 | Berger | 235—150.1X |
| 3,275,809 | 9/1966 | Tolin et al. | 235—151.12X |
| 3,309,507 | 3/1967 | Schlein | 235—151.12X |

PAUL J. HENON, Primary Examiner

U.S. Cl. X.R.

209—166; 235—150.1, 151.12